United States Patent [19]

Grosch

[11] 4,299,416
[45] Nov. 10, 1981

[54] SWIVEL WITH REMOVABLE PACKING GLAND

[76] Inventor: Wayne A. Grosch, R.R. #2, Osceola, Nebr. 68651

[21] Appl. No.: 126,338

[22] Filed: Mar. 3, 1980

[51] Int. Cl.³ .............................................. F16L 27/00
[52] U.S. Cl. ...................................... 285/281; 285/16
[58] Field of Search .................... 285/276, 281, 15, 16, 285/348

[56] References Cited

U.S. PATENT DOCUMENTS

| | | | |
|---|---|---|---|
| 1,280,536 | 10/1918 | Petersen | 285/281 |
| 2,088,418 | 7/1937 | King | 285/281 |
| 3,434,742 | 3/1969 | Swinney | 285/16 |
| 3,492,025 | 1/1970 | Holland | 285/348 |
| 3,497,244 | 2/1970 | Grantom | 285/16 |
| 3,679,235 | 7/1972 | Faccou | 285/281 |

*Primary Examiner*—Dave W. Arola
*Attorney, Agent, or Firm*—Zarley, McKee, Thomte, Voorhees & Sease

[57] ABSTRACT

A swivel for a reverse rotary drilling machine is described which is adapted to be positioned between a rotatable Kelly bar and a circulating fluid hose which extends laterally from the upper end of the swivel. The swivel comprises a packing body which is secured to the upper end of the Kelly bar and which extends upwardly therefrom. A bearing body is operatively secured to the upper end of the packing body and extends upwardly therefrom. A bearing stem is operatively secured to the fluid hose and extends downwardly into the open upper end of the bearing body and has its lower end threadably secured to a packing stem positioned within the packing body. Bearings are positioned between the interior surface of the bearing body and the exterior surface of the bearing stem. Packing material is positioned between the interior surface of the packing body and the exterior surface of the packing stem. A packing ring extends around the exterior surface of the packing stem and is designed to compress the packing material so that fluid cannot pass upwardly between the packing stem and the packing body. A plurality of bolts are operatively secured to the packing ring to cause the compression of the packing material.

8 Claims, 3 Drawing Figures

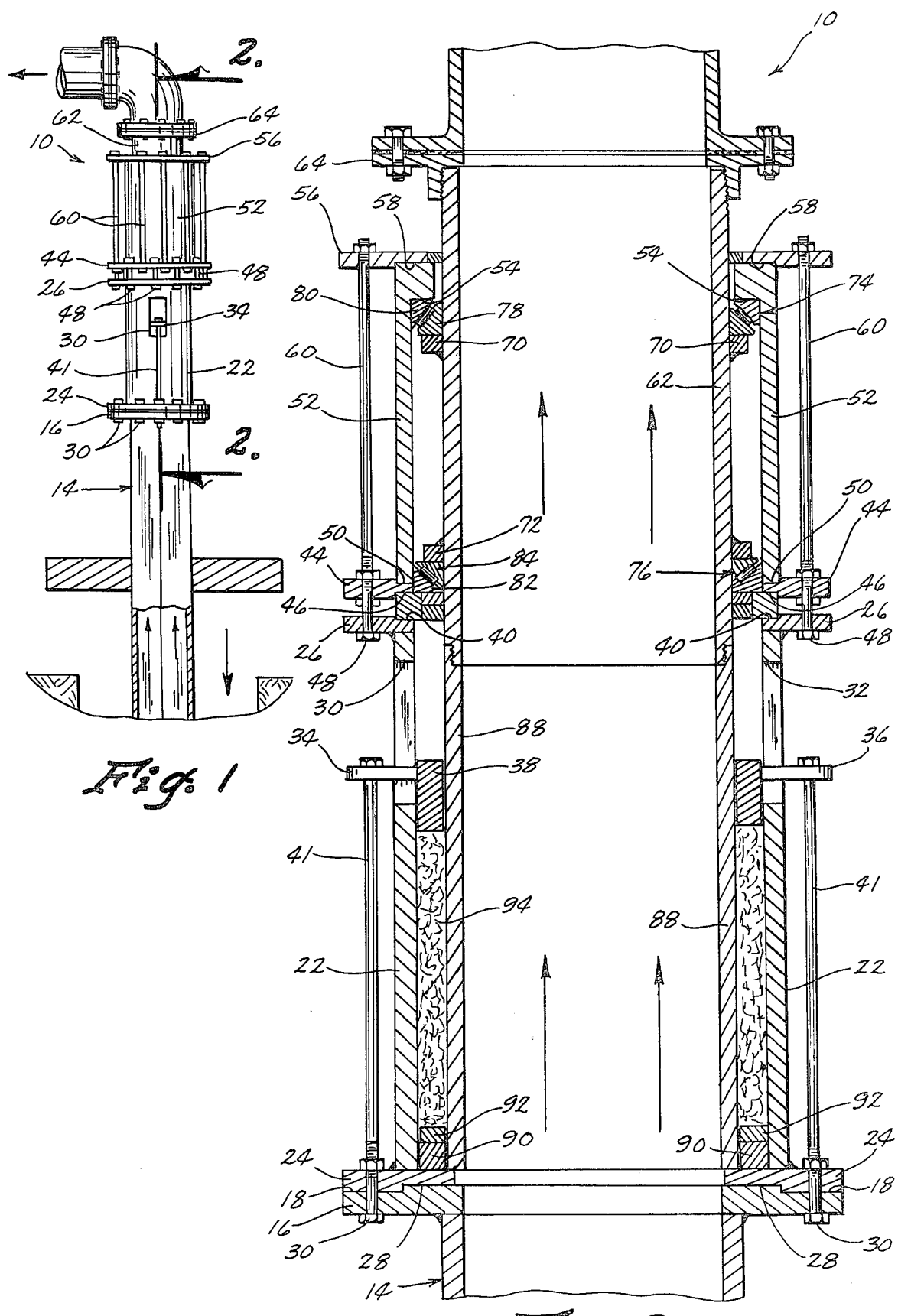

SWIVEL WITH REMOVABLE PACKING GLAND

BACKGROUND OF THE INVENTION

This invention relates to a swivel for a rotary drilling machine or rig and more particularly to a swivel for use with a reverse rotary drilling rig.

In rotary drilling machines, the swivel provides a means for forcing drilling fluid from stationary pump connections into the rotating drill column while the latter is suspended in the well. Being a part of the mechanism by which the drill column is suspended from the derrick or tower crown block, the swivel must be of massive construction so that it is capable of supporting the full weight of the drill column while it is being rotated by the rotary table.

Conventional swivels comprise several parts, all of which are contained within or attached to a heavy housing or the like supported by a bail or the like which is connected to the derrick crown block. In smaller drilling rigs, the upper end of the Kelly bar is vertically movably supported on the tower. Roller bearings in the body of the swivel support the rotating element which is attached at its lower end to the upper end of a Kelly bar. A washpipe extends downwardly into the upper end of the rotating sleeve which is ordinarily connected at its upper end with a gooseneck or the like which is threaded for connection with a flexible hose designed to carry high-presssure drilling fluid from the pump manifold. Bearings are provided between the rotating and non-rotating portions of the swivel and are immersed in oil and sealed to prevent drilling fluid from coming into contact with the bearings. In conventional rotary drilling operations, drilling fluid is supplied from the pump manifold to the flexible hose and thence downwardly into the washpipe and supplied to the Kelly bar and then to the interior of the drill column. The drilling fluid is forced from the drill bit and the drilling fluid returns to the fluid reservoir between the drill column and the wall of the well.

In recent years, reverse rotary drilling rigs have been employed wherein the drilling fluid is pumped downwardly between the wall of the well and the exterior surface of the drill column and is then forced upwardly through the drill column to the pump manifold or reservoir. In other words, the direction of flow of the drilling fluid is reversed from that of conventional rotary drilling machines. A severe problem has been encountered with the swivels in reverse rotary drilling rigs due to the fact that the reverse swivels presently available employ extremely complicated packing chambers which are almost impossible to disassemble and repack in a short period of time. Additionally, the packing chambers on the available reverse swivels do not effectively prevent drilling fluid from coming into contact with the bearings in the swivel and the bearings are quickly ruined which requires the replacement of the bearings which is obviously time consuming and expensive.

Therefore, it is a principal object of the invention to provide an improved swivel for a rotary drilling machine.

A still further object of the invention is to provide an improved swivel for a reverse rotary drilling machine.

A still further object of the invention is to provide a swivel for a reverse rotary drilling rig which can accommodate any type of drilling fluid whether it be air or mud.

A still further object of the invention is to provide a swivel for use with a drilling rig which may be of the air reverse, reverse drilling or conventional rotary drilling types.

A still further object of the invention is to provide a swivel wherein packing material may be conveniently added to the packing gland.

A still further object of the invention is to provide a swivel which is easily and quickly diassembled in the field to replace worn or damaged components.

A still further object of the invention is to provide a swivel of the type described which is economical of manufacture and durable in use.

These and other objects will be apparent to those skilled in the art.

BRIEF DESCRIPTION OF THE DRAWINGS

FIG. 1 is a side view of the swivel of this invention and illustrated as being secured to the upper end of a Kelly bar:

FIG. 2 is an enlarged sectional view seen on lines 2—2 of FIG. 1; and

SUMMARY OF THE INVENTION

Figure 3:
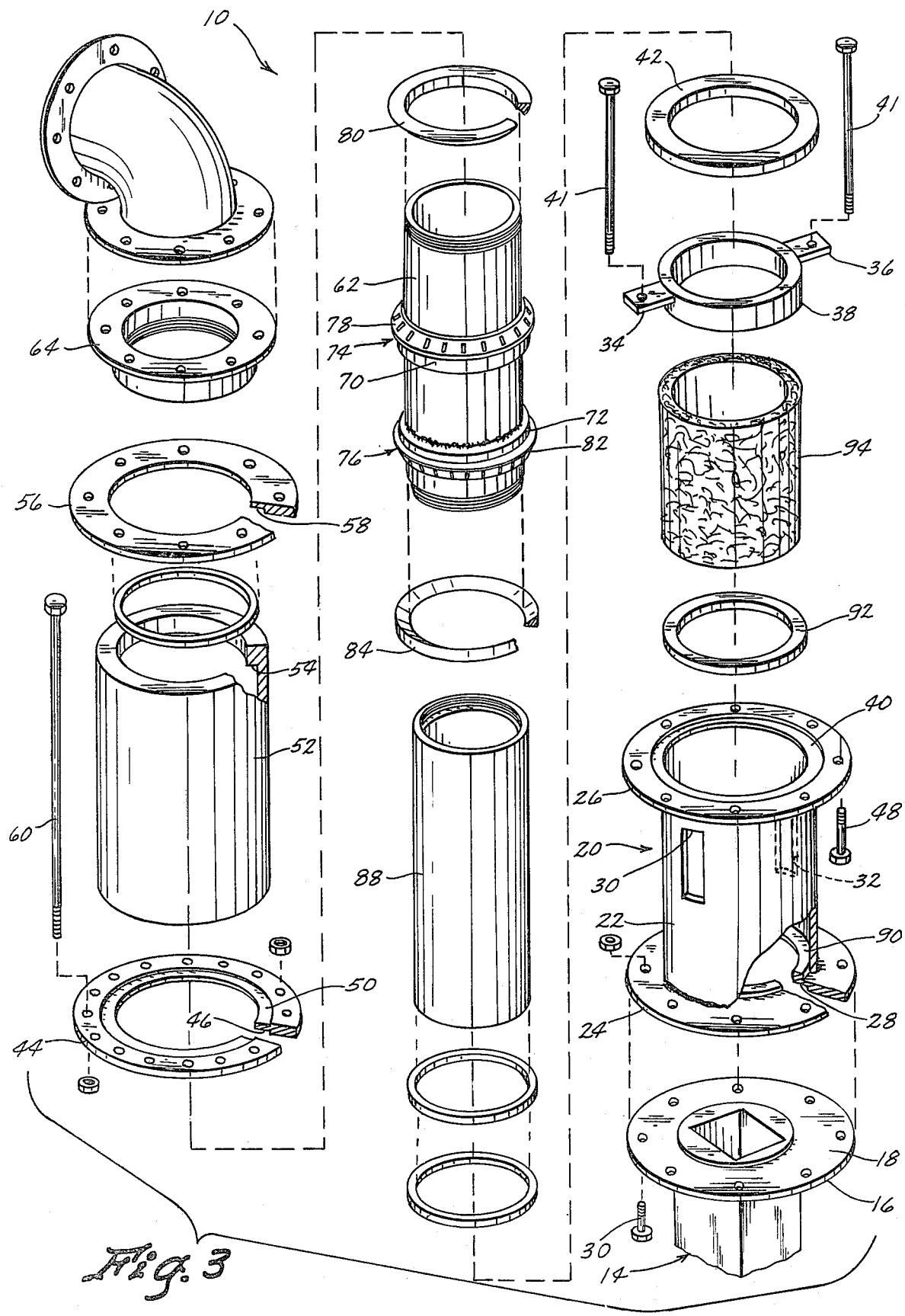
FIG. 3 is an exploded perspective view of the swivel of this invention.

A reverse swivel is described which permits the easy field disassembly thereof to repair or replace parts as needed. A packing body is secured to the upper end of a Kelly bar and extends upwardly therefrom. A bearing body is secured to the upper end of the packing body and has a bearing stem positioned therein. The upper end of the bearing stem is secured to a laterally extending fluid hose and has its lower end threadably secured to a packing stem positioned within the packing body. Bearings are mounted between the bearing body and the bearing stem. Packing material is positioned between the packing body and the packing stem and means is provided to compress the packing material therebetween to prevent drilling fluid from passing upwardly between the packing body and packing stem.

DESCRIPTION OF THE PREFERRED EMBODIMENT

The swivel of this invention is referred to generally by the reference numeral 10 and is designed to be positioned between a laterally extending pipe 12 and a Kelly bar 14. Kelly bar 14 includes a flange 16 at its upper end which includes an annular recess 18 extending around the upper outer end thereof.

Secured to the upper end of the Kelly bar 14 is a cylindrical packing body 20 comprising a barrel portion 22 and lower and upper flanges 24 and 26 respectively. Flange 24 is welded to the lower end of barrle 22 and includes an annular recess 28 formed in its lower interior end so as to be compatible with the flange 16 on Kelly bar 14 as illustrated in the drawings. A plurality of bolts 30 extend through the flanges 16 and 24 to secure the packing body 20 to the Kelly bar 14. Barrel 22 is provided with a pair of vertically disposed slots 30 and 32 which receive protruding portions 34 and 36 which are secured to packing ring 38. A plurality of bolts 41 connect the protruding portions 34 and 36 to the flanges 24 and 16 as will be described in more detail hereinafter. The upper inner end of flange 26 is provided with an annular recess portion 40 which receives a combination spacer and seal retainer 42 which is ring shaped. Flange 44 is positioned on retainer 42 and is provided with a recess portion 46 formed in its lower inner end which partially receives the retainer 42 as illustrated in the drawings. A plurality of bolts 48 extend through flanges 44 and 26 to maintain the retainer 42 in position. The upper inner end of flange 44 is recessed at 50 to partially receive the lower end of bearing body 52 which extends upwardly therefrom. Bearing body 52 is provided with a shoulder portion 54 at its upper inner end for a purpose to be described hereinafter. Flange 56 is positioned at the upper end of bearing body 52 and is provided with a recess portion 58 which partially receives the upper end of the body 52. A plurality of bolts 60 extend through flange 56 and 44 to maintain bearing body 52 in position.

The numeral 62 refers to a cylindrical bearing stem which is positioned within bearing body 52 and which has flange 64 threadably secured to the upper end thereof. Flange 64 is secured to the flange 66 mounted on pipe 12 by bolts 68. A pair of rings 70 and 72 are welded to the exterior surface of bearing stem 62 in a vertically spaced-apart relationship as illustrated in the drawings. The rings 70 and 72 serve to maintain the bearings 74 and 76 in position. Bearing 74 comprises cone 78 and cup 80 while bearing 72 comprises cone 82 and cup 84. Seals 86 and 87 embrace stem 62 between the seal retainer 42 and stem 62 as seen in the drawings. Threadably secured to the lower end of stem 62 is packing stem 88 which extends downwardly therefrom within packing body 20. The lower end of stem 88 is received by ring 90 which is welded to the lower interior end of barrel portion 22 of packing body 20. A floating ring 92 extends around the lower end of packing stem 88 above ring 90. The numeral 94 refers to conventional packing material positioned above ring 92 and below ring 38. The numeral 95 refers to a seal positioned between flange 56 and stem 62 to prevent rainwater from running downwardly into the apparatus.

Thus it can be seen that a very unique reverse swivel has been described. The drilling fluid is passed downwardly between the exterior surface of the drill column and the well and is directed upwardly through the drill column into the interior of the Kelly bar. As the fluid moves upwardly from the Kelly bar into the lower end of the packing stem, the rings 90 and 92 and the packing material 94 prevent the drilling fluid from moving upwardly between the packing body and packing stem thereby preventing the drilling fluid from coming into contact with the bearings. As the packing material 94 becomes worn due to the fact that packing body 20 is rotating with respect to packing stem 88, the bolts 41 may be tightened to cause the ring 38 to further compress the packing material 94 downwardly onto the floating ring 92. If it is necessary to add packing material 94, the bolts 41 are loosened to permit the ring 38 to be moved upwardly as far as possible. Packing material 94 is then inserted through the slots 30 and 32 so as to be positioned between the packing body 20 and the packing stem 88. After the packing material has been so positioned, the bolts 41 are again tightened to cause the compression of the packing material.

Field disassembly of the swivel of this invention is infrequent due to the fact that if drilling fluid should pass between packing material 94 and the stem 88, the drilling fluid will exhaust outwardly at openings 30 and 32 thereby preventing the fluid from coming into contact with the bearings. Ordinarily, the only parts requiring replacement will be stem 88 and the packing material 94. If the replacement of stem 88 is necessary, the Kelly bar 14 is lowered to the table of the drilling rig. Bolts 48 and 41 are then removed with the swivel then being raised from the Kelly bar. Upward movement of the swivel with respect to the Kelly bar will leave barrel 22 connected to the Kelly bar 14 and will expose stem 88. At this point, the packing 94 can be removed and the stem 88 can be unthreaded from bearing stem 62. A new packing stem can then be threaded on and the above procedure reversed.

Although the swivel is described as being ideally suited for use as a reverse swivel, it should be noted that it can also be used as a conventional swivel and could be used for air reverse drilling, vacuum reverse drilling and conventional rotary drilling.

Thus it can be seen that the swivel accomplishes at least all of its stated objectives.

I claim:

1. A swivel for a rotary drilling machine including a rotatable Kelly bar and means for circulating drilling fluid through the Kelly bar, comprising, a hollow cylindrical packing body having upper and lower ends, means removably securing the lower end of said packing body to the upper end of said Kelly bar, a hollow cylindrical packing stem positioned within said packing body, packing material between the outside surface of said packing stem and the inside surface of said packing body, a packing gland ring positioned within said packing body and extending around said packing stem above said packing material, said packing body having at least a pair of vertically disposed slots formed therein, said packing gland ring having protruding portions extending through said slots, means connected to each of said protruding portions and said packing body for selective movement of said packing gland ring whereby said packing material may be compressed into sealing engagement with the inside surface of said packing body and the outside surface of said packing stem, means at the lower interior end of said packing body extending around said packing stem for preventing said packing material from being forced from between said packing body and stem when said packing gland ring is selectively moved downwardly relative to said packing body and stem, means securing a bearing body to the upper end of said packing body, said bearing body extending upwardly from said packing body, said bearing stem mounted within said bearing body and having its lower end threadably secured to the upper end of said packing stem, means connecting the upper end of said bearing stem to a hose means extending laterally therefrom to said means for circulating drilling fluid, a bearing means between said bearing body and said bearing stem to permit rotation of said Kelly bar, packing body and said bearing body relative to said bearing stem and hose means, said packing material preventing the drilling fluid, which is being circulated through said Kelly bar, from coming into contact with said bearing means.

2. The swivel of claim 1 wherein said bearing means comprises a pair of bearings and said bearing stem has a pair of vertically spaced apart rings mounted on its outside surface which maintain said pair of bearings in position.

3. The swivel of claim 1 wherein said means at the lower interior end of said packing body comprises a first ring secured to the lower interior end of said packing body which embraces said packing stem.

4. The swivel of claim 3 wherein a floating ring is positioned about said first ring.

5. The swivel of claim 1 wherein a seal means rotatably embraces said bearing stem below said bearing means.

6. The swivel of claim 5 wherein a spacer is positioned between said bearing body and packing body, said seal means being positioned between said spacer and said bearing stem.

7. The swivel of claim 1 wherein said means securing said bearing body to said packing body includes removable flanges mounted on the upper and lower ends of said bearing body and wherein a plurality of bolt members are secured to and extend between said flanges.

8. A swivel for a rotary drilling machine including a rotatable Kelly bar and means for circulating a drilling medium through the Kelly bar, comprising, a hollow packing body having upper and lower ends,
means removably securing the lower end of said packing body to the upper end of said Kelly bar,
a hollow packing stem positioned within said packing body,
packing material between the outside surface of said packing stem and the inside surface of said packing body,
a packing gland ring positioned within said packing body and extending around said packing stem above said packing material,
said packing body having at least a pair of vertically disposed slots formed therein,
said packing gland ring having protruding portions extending through said slots,
means connected to each of said protruding portions and said packing body for selective movement of said packing gland ring whereby said packing material may be compressed into sealing engagement with the inside surface of said packing body and the outside surface of said packing stem,
means at the lower interior end of said packing body extending around said packing stem for preventing said packing material from being forced from between said packing body and stem when said packing gland ring is selectively moved downwardly relative to said packing body and stem,
means securing a bearing body to the upper end of said packing body, said bearing body extending upwardly from said packing body,
a bearing stem mounted within said bearing body and having its lower end threadably secured to the upper end of said packing stem,
means connecting the upper end of said bearing stem to a hose means extending laterally therefrom to said means for circulating drilling medium,
a bearing means between said bearing body and said bearing stem to permit rotation of said Kelly bar, packing body and said bearing body relative to said bearing stem, packing stem and hose means,
said packing material preventing the drilling medium, which is being circulated through said Kelly bar, from coming into contact with said bearing means.

* * * * *